(12) United States Patent
Kuo

(10) Patent No.: US 6,310,289 B1
(45) Date of Patent: Oct. 30, 2001

(54) CABLE FASTENING DEVICE

(75) Inventor: Chunn-Cherh Kuo, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/425,186

(22) Filed: Oct. 25, 1999

(51) Int. Cl.$^7$ ...................................................... H02G 3/18
(52) U.S. Cl. .......................... 174/65 R; 174/135; 248/49; 439/274
(58) Field of Search .................................... 174/64, 65 R, 174/65 G, 65 SS, 135, 152 G, 153 G; 16/2.1, 2.2; 248/56, 49; 439/274, 275

(56) References Cited

U.S. PATENT DOCUMENTS

| | | | |
|---|---|---|---|
| 5,638,584 | * 6/1997 | DeAnfrasio | 24/265 H |
| 5,676,339 | * 10/1997 | Simon | 248/56 |
| 5,887,487 | * 3/1999 | Bravo | 74/502.4 |
| 5,918,837 | * 7/1999 | Vicain | 248/49 |
| 6,126,135 | * 10/2000 | Derman | 248/51 |

* cited by examiner

Primary Examiner—Dean A. Reichard
Assistant Examiner—Dhiru R Patel

(74) Attorney, Agent, or Firm—Rosenberg, Klein & Lee

(57) ABSTRACT

A cable fastening device is provided having a sector-shaped housing including detachable lower and upper housings having a hollow arcuate raised member at a corner with a longitudinal central hole formed in the arcuate raised member, an internal arcuate grooved rail adjacent to the hole, first teeth adjacent to the grooved rail, an internal circuit board; and a hollow positioning means having a top side, two sides, and a bottom side including a pair of first posts raised from predetermined positions of the top and bottom sides respectively. A pair of arcuate recesses are provided on the top and bottom sides respectively, each having second teeth, and a transverse cable passing hole formed therein. The first posts are inserted into the central holes. The arcuate recesses are slidably engaged against the grooved rail, and the second teeth are engaged with the first teeth so as to tooth-by-tooth laterally move a cable along the arcuate recesses in order to adjust cable direction. The device further includes an arcuate recessed portion having an aperture provided on one straight edge of the housing, a pivotal member having an arcuate raised side and a planar side, a second post formed on the arcuate raised side, and a spring on the second post. The second post is inserted into the aperture such that the pivotal member may pivot vertically a limited angle with respect to the attached device.

10 Claims, 5 Drawing Sheets

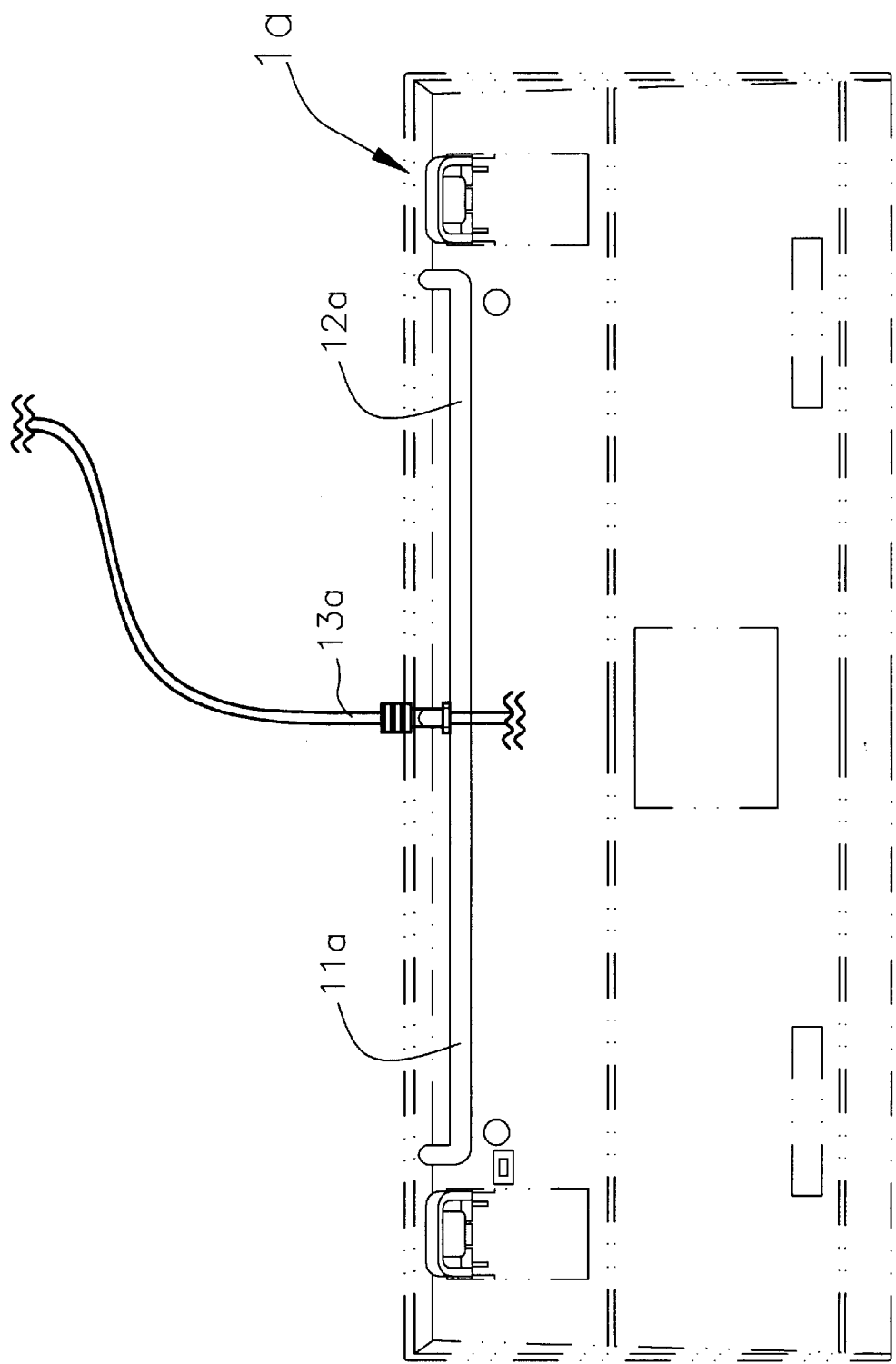

CABLE FASTENING DEVICE

BACKGROUND OF THE INVENTION

1. Field of the Invention

The present invention relates to a fastening device and more particularly to a cable fastening device for computer peripheral such as a keyboard.

2. Description of Related Art

A conventional cable fastening mechanism of keyboard 1a is shown in FIG. 1 wherein left and right grooves 11a and 12a each having an equal predetermined length are provided on a side of the bottom of the cable connected keyboard 1a whereby cable 13a may be received in either left groove 11a or right groove 12a prior to extending therefrom. Such arrangement has the advantage of preventing cable from breaking when pulling. But this fastening mechanism is unsatisfactory for the following reasons:

1. A sufficient width and depth of the groove 11a or 12a is required in order to be adapted to various cables 13a. However, this precision is not obtainable easily.
2. It is still possible of breaking the cable 13a due to cable 13a is bent about 90 degrees.
3. The provision of left and right grooves 11a and 12a wastes a precious space of the bottom of keyboard 1a. Such is especially undesirable in a narrowed cable entry and withdrawal area.

Thus, it is desirable to provide an improved cable fastening device in order to overcome the above drawbacks of prior art.

SUMMARY OF THE INVENTION

It is an object of the present invention to provide a cable fastening device which is realized by providing a cable positioning means pivotal with respect to the attached fastening device such that cable is capable of turning about fastening device in a limited range. Such cable fastening device has the advantages of making cable uneasy to break, adapted to various cables, no sharp bending of cable, suitable to be used in narrowed cable entry and withdrawal area, fixing fastening device by means of pivotal means, improving the the quality of signal received by wire or wireless technique, and readily adapted to various operating environments.

The above and other objects, features and advantages of the present invention will become apparent from the following detailed description taken with the accompanying drawings.

BRIEF DESCRIPTION OF THE DRAWINGS

FIG. 1 is a bottom plan view of a conventional cable fastening mechanism of a cable connected keyboard;

DETAILED DESCRIPTION OF THE PREFERRED EMBODIMENTS

Figures 2, 2A, 2B:
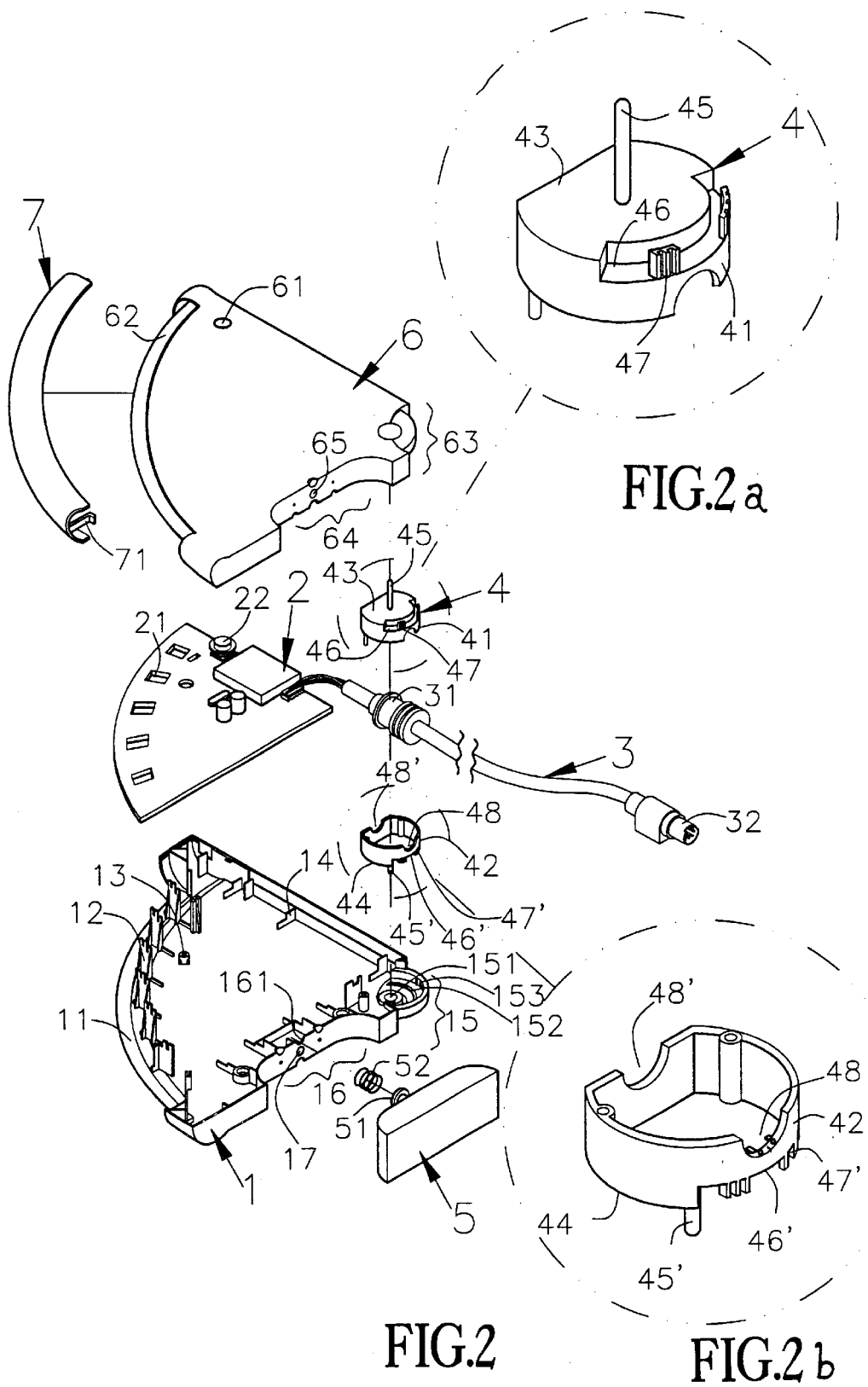
FIG. 2 is an exploded view of a first embodiment of the cable fastening device of the present invention.
FIG. 2a is an enlarged view of a first portion of the view shown in FIG. 2.
FIG. 2b is an enlarged view of a second portion of the view shown in FIG. 2.
Figure 3:
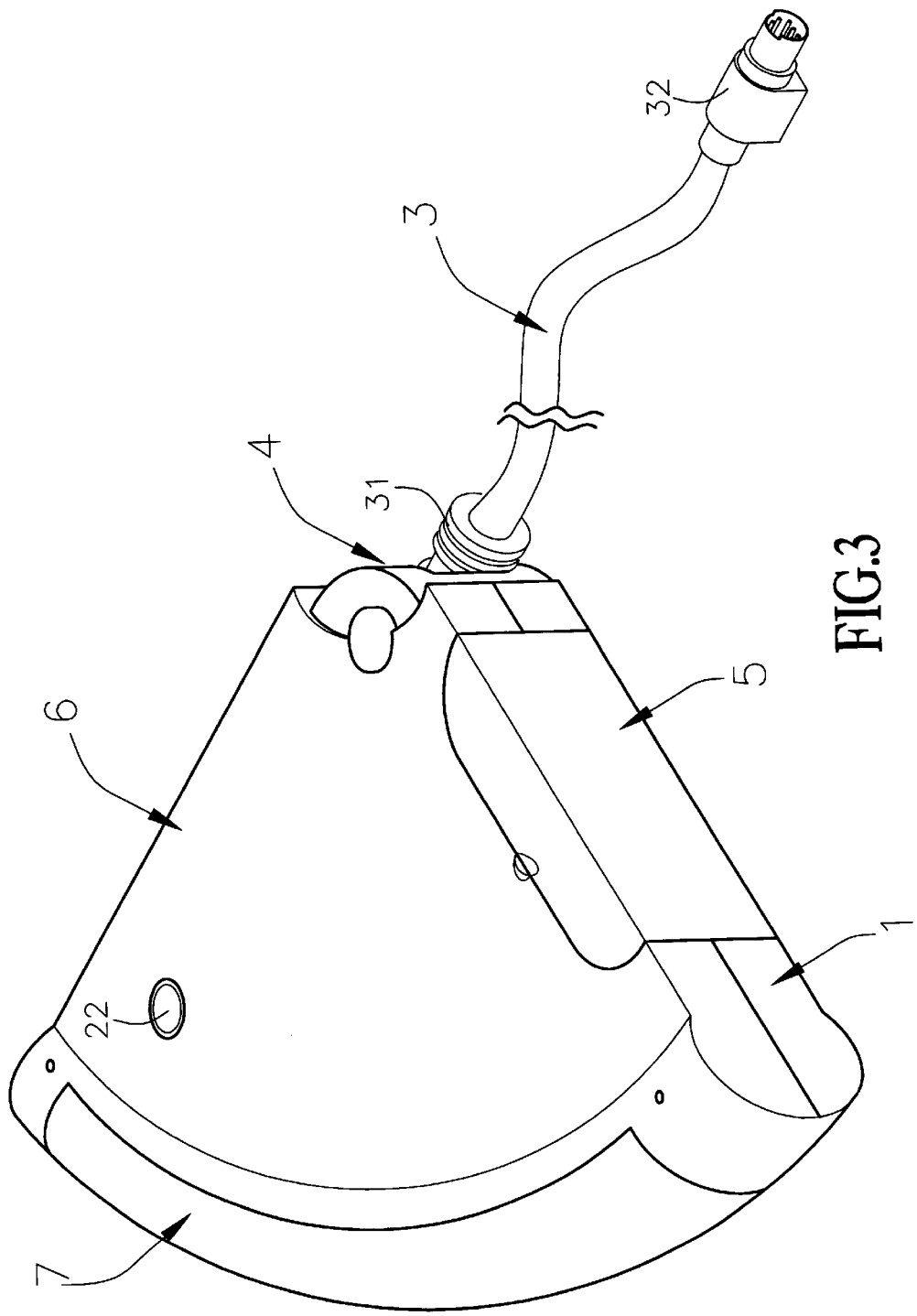
FIG. 3 is a perspective view showing a cable extended in one direction of FIG. 2.
Figure 4:
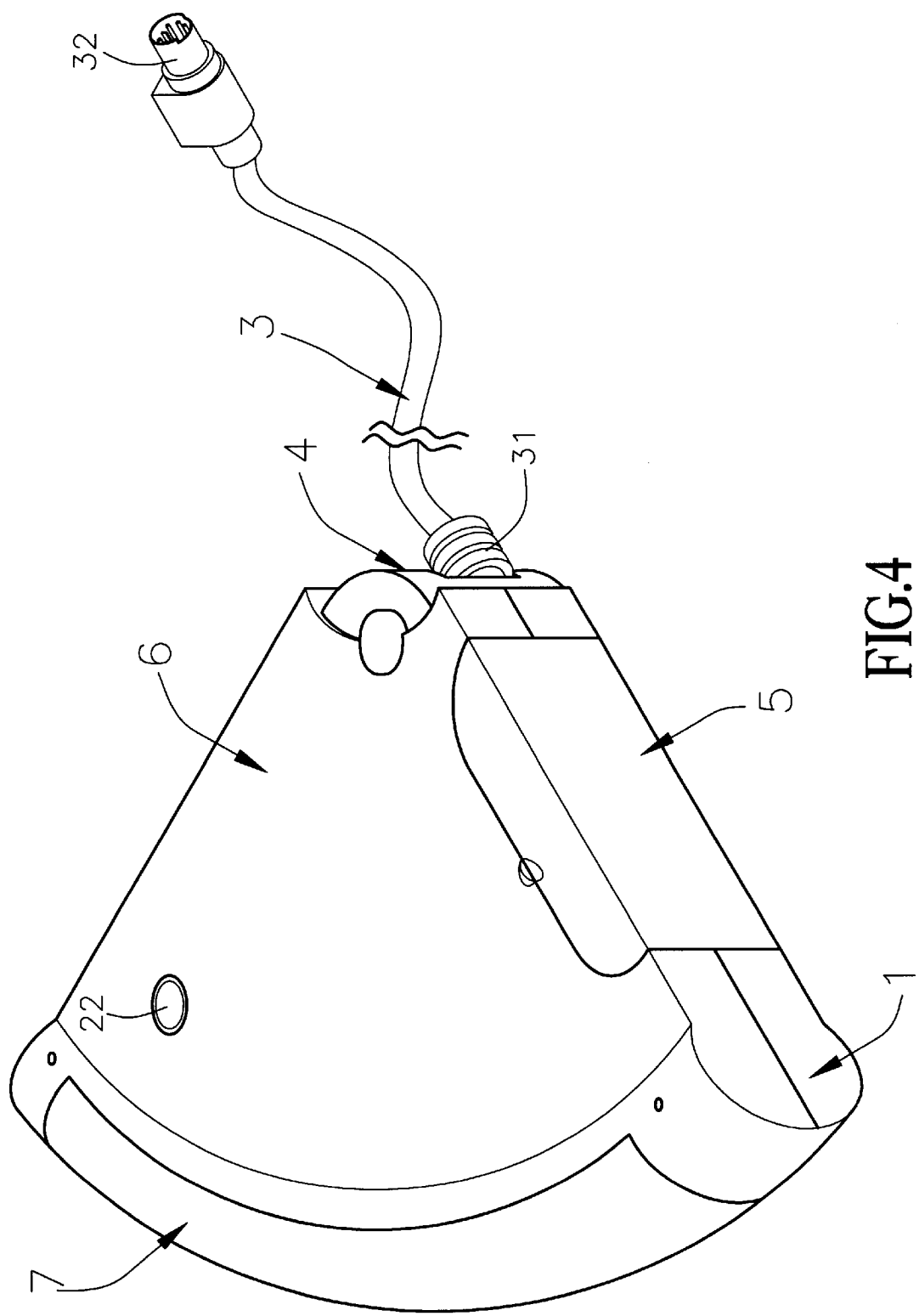
FIG. 4 is another perspective view showing a cable extended in the other direction of FIG. 2; and, FIG. 5 is a bottom plan view of a second embodiment of the cable fastening device of the present invention.

Referring to FIGS. 2–4, there is shown a first embodiment of cable fastening device A of the present invention. The fastening device A comprises a lower housing 1, a circuit board 2, a predetermined length of cable 3, a cable positioner 4 horizontally pivotal with respect to fastening device A, a pivotal member 5 vertically pivotal with respect to fastening device A, an upper housing 6 engaged correspondingly to lower housing 1, and a transparent arcuate front housing 7 having a generally C-shaped cross-section. The lower housing 1 is a sector like member having an arcuate raised member 15 located on the join of two straight edges thereof. The arcuate raised member 15 has a central hole 151, an arcuate grooved rail 152 adjacent to the hole 151, a number of teeth 153 adjacent to the grooved rail 152 and provided on the inner surface of arcuate raised member 15. The lower housing 1 further comprises an arcuate recessed portion 16 on one planar side. The cable positioner 4 is a hollow member generally with an arcuate raised portion on one side and a planar side. The cable positioner 4 comprises an upper half portion 41 and an identical lower half portion 42. The upper and lower half portions 41 and 42 have posts 45 and 45' raised from centers of top and bottom surfaces, arcuate recesses 46 and 46' provided on arcuate raised portions each having a number of teeth 47, 47' thereon, and half circular recesses 48 and 48' adjacent to recesses 46 and 46' for receiving cable 3 respectively. Post 45 and 45' are inserted through aperture 151 from opposing directions respectively. Arcuate recesses 46 and 46' are engaged against grooved rail 152 and slidable therealong. Accordingly, both teeth 47 and 47' are engaged with teeth 153 so as to be capable of moving one tooth at a time therealong in order to adjust extending direction of cable 3. The pivotal member 5 a member has an arcuate raised portion one one side and a planar opposing side. A post 51 is formed on the arcuate raised portion of the pivotal member 5. A coil spring 52 is put on post 51. Post 51 is inserted into aperture 161 of arcuate recessed portion 16 such that pivotal member 5 may pivot vertically a predetermined limited angle (e.g., 90 degrees) with respect to the attached fastening device A.

It is noted that the embodiment shown in FIGS. 2–4 is implemented in a wireless technique, i.e., the fastening device acted as an radio receiver for receiving signal transmitted from keyboard. The lower housing 6 has an arcuate recessed portion 11, a number of equally spaced projections 12 provided along the arcuate edge of recessed portion 11, a number of risers 13 provided on the top surface, a number of snap members 14 provided along the straight edges, arcuate raised member 15, arcuate recessed portion 16, and a number of recesses 17 provided on the arcuate surface of recessed portion 16.

Circuit board 2 having a sector shape is provided within fastening device A and comprises a number of openings 21 along the arcuate side. Circuit board 2 is firmly secured within fastening device A when projections 12 and riser 13 are inserted into corresponding openings 21 and snap members 14 are engaged with circuit board 2. Circuit board 2 further has a button member 22 provided near a side.

A proximal end of cable 3 is attached to circuit board 2, while a distal end is provided with a connector 32. A ring member 31 is provided near the proximal end.

Additionally, a number of small raised portions (not shown) may be provided surrounding post 51 so as to be received in the corresponding recesses 17 when pivotal member 5 is pivotably attached to arcuate recessed portion 16 by means of inserting post 51 into aperture 161.

Upper housing 6 has a hole 61 on a side, an arcuate recessed portion 62, an arcuate raised member 63, and an arcuate recessed portion 64 such that, as stated above, upper housing 6 can correspondingly engage with lower housing 1. Then button member 22 is protruded from the hole 61.

The arcuate front housing 7 has an elastic section 71 on either end so as to engage with the corresponding end of engaged recessed portion 11 of lower housing 1 and recessed portion 62 of upper portion 6.

Figure 5:
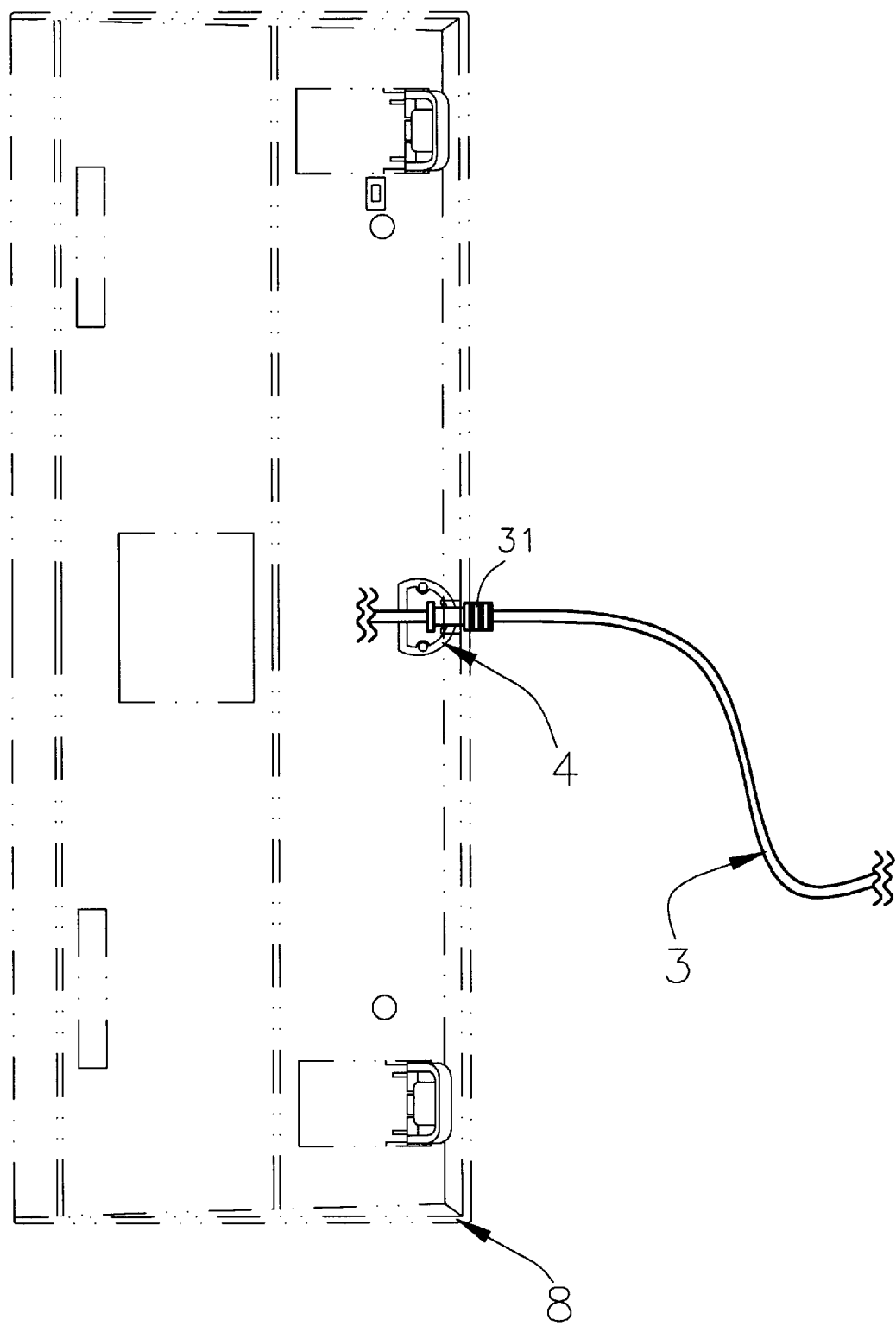

FIG. 5 illustrates a second embodiment of cable fastening device of the invention. This embodiment is different from the first embodiment by forming cable positioner 4 on the bottom of cable connected keyboard 8 so as to turn about fastening device in a limited range.

ADVANTAGES OVER PRIOR ART

1. Making cable uneasy to break.
2. Adapted to various cables.
3. No sharp bending of cable.
4. Suitable to be used in narrowed cable entry and withdrawal area.
5. Fixing fastening device by means of pivotal member.
6. Improving the quality of signal received by wire or wireless technique.
7. Readily adapted to various operating environments.

While the invention herein disclosed has been described by means of specific embodiments, numerous modifications and variations could be made thereto by those skilled in the art without departing from the scope of the invention set forth in the claims.

What is claimed is:

1. A cable fastening device for a keyboard comprising:
   (a) a housing including detachably attached upper and lower housing sections, each of said upper and lower housing sections having an arcuate raised member adjoining a pair of edge portions extending transversely one relative to the other, said arcuate raised member having formed therein a central hole extending along an axial direction, said arcuate raised member having an arcuate wall portion and a plurality of first teeth projecting radially inward therefrom; and,
   (b) a substantially hollow positioning assembly disposed between said arcuate raised members of said upper and lower housing sections in pivotally displaceable manner about said axial direction, said positioning assembly including top and bottom portions, said positioning assembly including a first post extending axially from each of said top and bottom portions to engage said central hole of one said housing section, said positioning assembly having formed in said top and bottom portions an arcuate recess and a plurality of second teeth disposed therein to engage at least a portion of said first teeth, said top and bottom portions defining transverse openings for the passage of a cable radially therethrough;
   whereby said positioning assembly is adjustably displaceable in angular position about said axial direction for adaptively retaining the cable.

2. The cable fastening device as recited in claim 1 wherein at least one part of said positioning assembly describes substantially an arcuate contour, and another part of said positioning assembly describes substantially a planar contour.

3. The cable fastening device as recited in claim 1 wherein said first posts are respectively disposed to extend centrally from said top and bottom portions.

4. The cable fastening device as recited in claim 1 wherein said positioning assembly includes upper and lower half members.

5. The cable fastening device as recited in claim 1 wherein each said upper and lower housing section includes at least one said edge portion defining an arcuate recessed region, said arcuate recessed having formed therein an aperture.

6. The cable fastening device as recited in claim 5 further comprising a pivotal member coupled in pivotally displaceable manner to said housing, said pivotal member having an arcuate raised portion for conformingly engaging said arcuate recessed regions of said upper and lower housing sections, said pivotal member including a second post projecting from said arcuate raised portion to pivotally engage said aperture.

7. The cable fastening device as recited in claim 6 wherein said pivotal member is coupled to said housing in spring biased manner.

8. The cable fastening device as recited in claim 7 wherein said arcuate recessed region of at least one said upper and lower housing section has formed therein a plurality of recesses, and said pivotal member has formed on said arcuate raised portion thereof a plurality of raised members for engaging said recesses.

9. The cable fastening device as recited in claim 1 wherein said arcuate raised member of at least one said upper and lower housing section has formed therein an arcuate grooved rail slidably engaging one said arcuate recess of said positioning assembly.

10. The cable fastening device as recited in claim 9 wherein said arcuate raised member of each said upper and lower housing section has formed therein an arcuate grooved rail slidably engaging one said arcuate recess of said positioning assembly.

* * * * *